(12) United States Patent
Yamada et al.

(10) Patent No.: US 11,623,505 B2
(45) Date of Patent: Apr. 11, 2023

(54) ELECTRIC WORK VEHICLE

(71) Applicant: Kubota Corporation, Osaka (JP)

(72) Inventors: Masahiro Yamada, Sakai (JP);
Hirokazu Ito, Sakai (JP); Makoto Odagiri, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 17/339,215

(22) Filed: Jun. 4, 2021

(65) Prior Publication Data

US 2022/0080818 A1 Mar. 17, 2022

(30) Foreign Application Priority Data

Sep. 16, 2020 (JP) .............................. JP2020-155677

(51) Int. Cl.
*B60K 1/04* (2019.01)
*B60L 50/60* (2019.01)

(52) U.S. Cl.
CPC ................ *B60K 1/04* (2013.01); *B60L 50/66* (2019.02); *B60K 2001/0494* (2013.01); *B60Y 2200/223* (2013.01)

(58) Field of Classification Search
CPC .. A01D 34/81; B60K 1/04; B60K 2001/0416; B60K 2001/0477; B60K 2001/0494; B60L 50/66
See application file for complete search history.

(56) References Cited

U.S. PATENT DOCUMENTS

| | | | |
|---|---|---|---|
| 3,797,600 A * | 3/1974 | Miner ................ | A47L 11/4005 |
| | | | 180/68.5 |
| 10,980,173 B2 * | 4/2021 | Becke ................. | H01M 10/488 |
| 11,148,518 B2 * | 10/2021 | Uemura .................... | B60K 1/04 |
| 11,273,716 B2 * | 3/2022 | Matsuda ................. | A01D 34/78 |
| 2017/0136864 A1 * | 5/2017 | Ito ........................... | B60L 50/66 |
| 2018/0026244 A1 * | 1/2018 | Ito ........................ | H01M 50/256 |
| | | | 429/96 |
| 2018/0338416 A1 * | 11/2018 | Uemura ............... | A01D 34/008 |
| 2019/0014718 A1 * | 1/2019 | Uemura ................... | B60L 50/66 |
| 2020/0290465 A1 * | 9/2020 | Matsuda .................. | B60K 1/04 |
| 2020/0365854 A1 * | 11/2020 | Yamada .................... | B60K 1/04 |
| 2021/0101462 A1 * | 4/2021 | Ito ..................... | H01R 13/62961 |
| 2021/0300167 A1 * | 9/2021 | Yamada ................. | A01D 69/02 |
| 2022/0080818 A1 * | 3/2022 | Yamada .................. | B60K 1/04 |
| 2022/0097535 A1 * | 3/2022 | Hickey .................... | B60K 1/00 |
| 2022/0248600 A1 * | 8/2022 | Yamada ................. | A01D 69/02 |

FOREIGN PATENT DOCUMENTS

EP 3885173 A1 9/2021
JP 2018197076 A 12/2018

* cited by examiner

*Primary Examiner* — Jeffrey J Restifo
(74) *Attorney, Agent, or Firm* — The Webb Law Firm

(57) ABSTRACT

An electric work vehicle includes: a carrier 32 in which a battery can be stored and a support portion 40 is provided; a carrier storage portion provided in a vehicle body and capable of holding the carrier 32; a guide portion 21, 22 that is capable of supporting, via the support portion 40, the carrier 32 operated so as to be lifted from the ground, in a state in which the carrier is lifted from the ground, and guiding the carrier 32 toward the carrier storage portion; and a positioning portion 42 configured to, when the carrier 32 placed on the ground is operated so as to be lifted and the support portion 40 has reached a position at which the support portion 40 can be supported by the guide portion 21, 22, stop the operation of lifting the carrier 32.

8 Claims, 14 Drawing Sheets

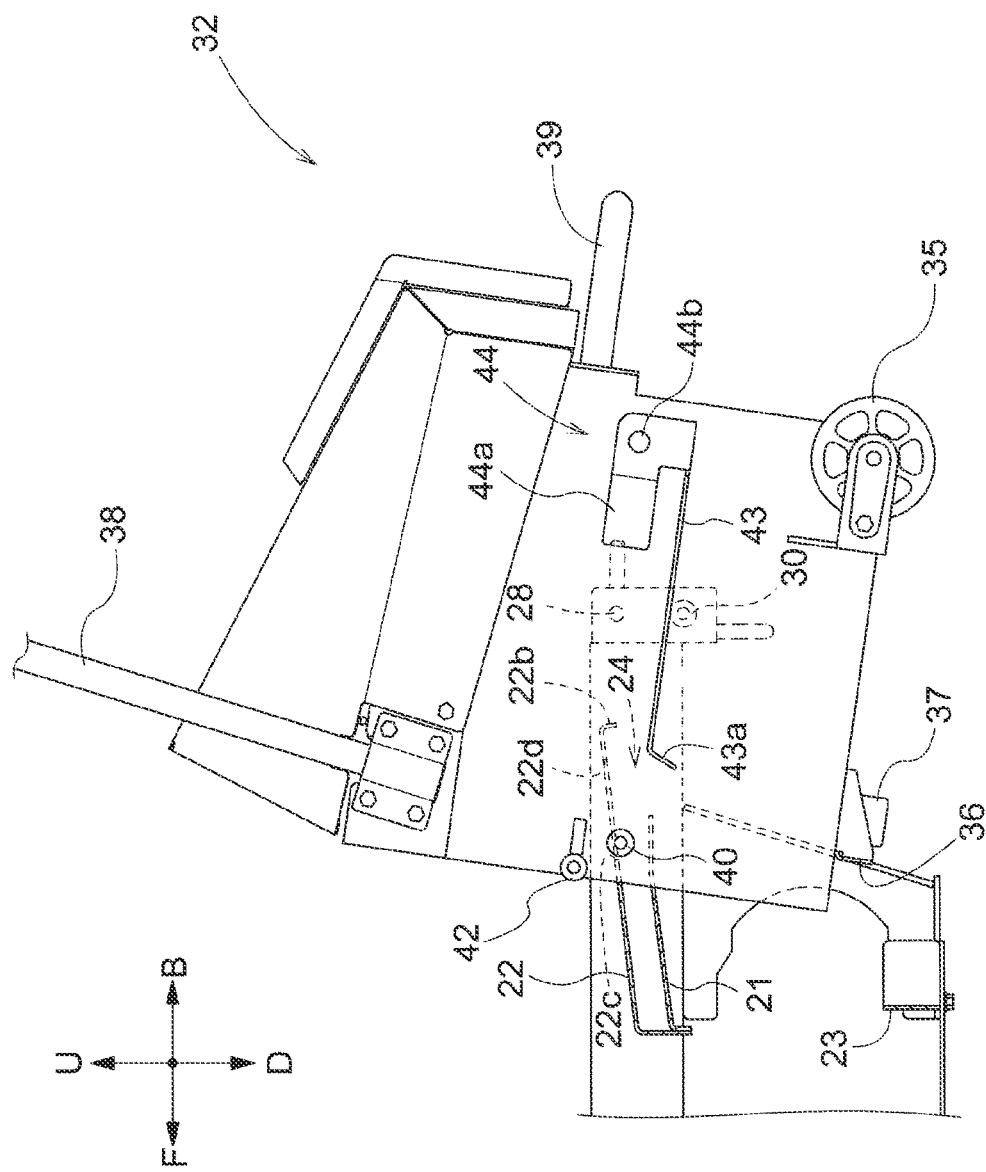

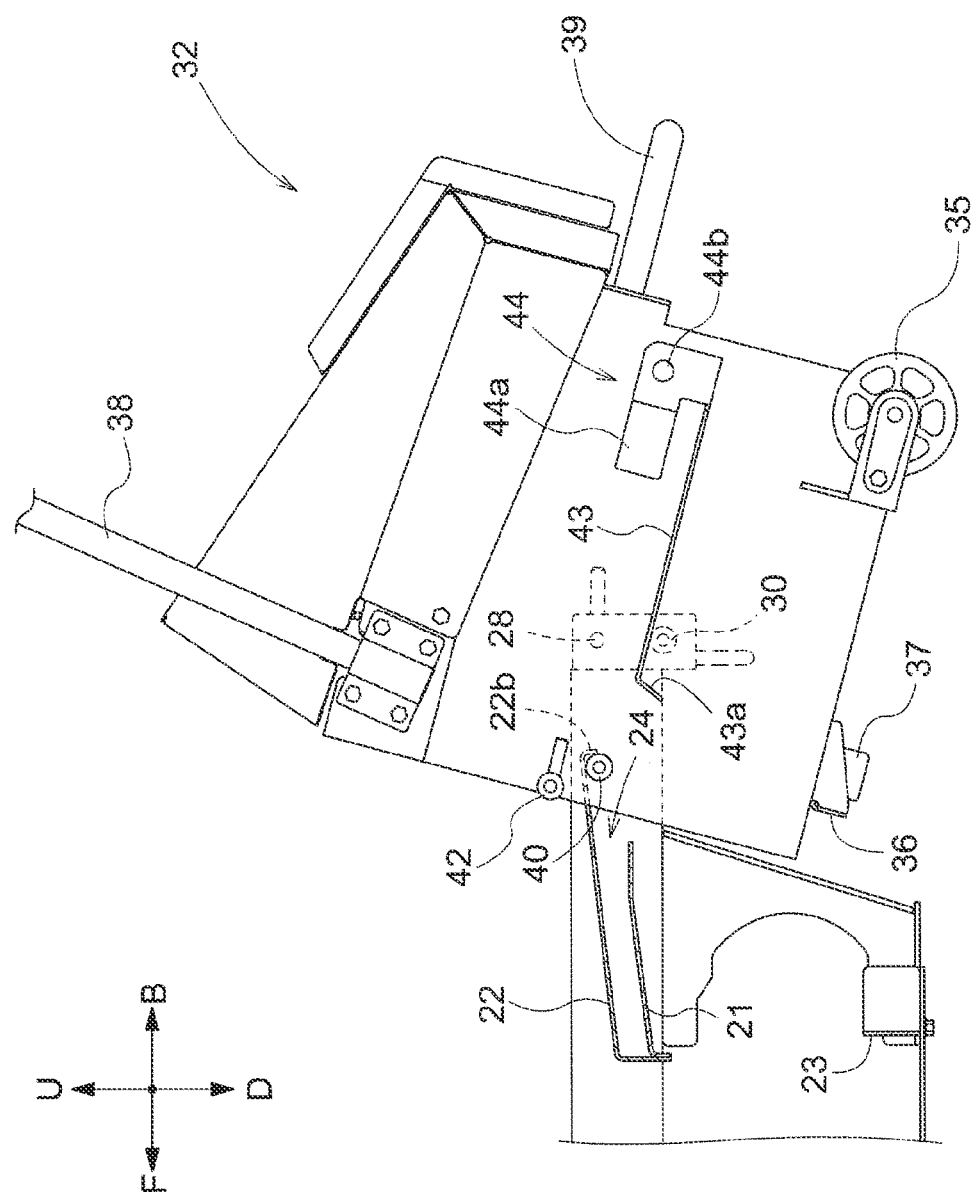

ELECTRIC WORK VEHICLE

CROSS-REFERENCE TO RELATED APPLICATION

This application claims priority to Japanese Patent Application No. 2020-155677 filed Sep. 16, 2020, the disclosure of which is hereby incorporated by reference in its entirety.

BACKGROUND OF THE INVENTION

1. Field of the Invention

The present invention relates to an electric work vehicle that is a work vehicle such as a riding mower or a tractor, and that works while traveling with a battery mounted thereon.

2. Description of the Related Art

As disclosed in JP2018-197076A, an example of the electric work vehicle is a riding mower that works while traveling with a battery mounted thereon. In JP2018-197076A, a carrier in which a battery can be stored is provided. The electric work vehicle is configured such that the battery is replaced by attaching and removing the carrier to and from the vehicle body.

In JP2018-197076A, an operator operates a front portion of the carrier placed on the ground so as to lift it, and places the front portion of the carrier on a roller of the vehicle body while moving the carrier forward.

The operator then operates a rear portion of the carrier so that it is lifted, causes the carrier to be supported by a guide portion of the vehicle body, and pushes the carrier forward, thus installing the carrier in a carrier storage portion of the vehicle body.

JP2018-197076A is an example of related art (see FIGS. 7 to 12).

SUMMARY OF THE INVENTION

According to JP2018-197076A, when the operator operates the carrier placed on the ground so as to be lifted, and causes the carrier to be supported by the guide portion of the vehicle body, the height of the carrier needs to be aligned with the height of the guide portion of the vehicle body.

An object of the present invention is to configure an electric work vehicle such that, when an operator operates a carrier placed on the ground so as to be lifted, and causes the carrier to be supported by a guide portion of the vehicle body, the operator can easily perform the operation of aligning the height of the carrier with the height of the guide portion of the vehicle body.

An electric work vehicle according to the present invention includes: a vehicle body capable of traveling; a carrier in which a battery can be stored and a support portion is provided; a carrier storage portion provided in the vehicle body and capable of holding the carrier; a guide portion that is capable of supporting, via the support portion, the carrier operated so as to be lifted from the ground, in a state in which the carrier is lifted from the ground, and guiding the carrier from an outer side of the vehicle body toward the carrier storage portion, and that guides the carrier from the carrier storage portion toward the outer side of the vehicle body so as to allow a state in which the carrier is removed from the vehicle body and placed on the ground; and a positioning portion configured to, when the carrier placed on the ground is operated so as to be lifted and the support portion has reached a position at which the support portion can be supported by the guide portion, stop the operation of lifting the carrier so as to allow transition to a state in which the support portion is supported by the guide portion.

According to the present invention, when the carrier placed on the ground is installed in the carrier storage portion of the vehicle body, the operator operates the carrier placed on the ground so as to be lifted, and causes the support portion of the carrier to be supported by the guide portion of the vehicle body.

According to the present invention, as the operator operates the carrier placed on the ground so as to be lifted, the operation of lifting the carrier is stopped by the positioning portion when the support portion of the carrier has reached a position at which the support portion can be supported by the guide portion of the vehicle body. Accordingly, the operator can easily recognize that the support portion of the carrier has reached a position at which the support portion can be supported by the guide portion of the vehicle body. The operator can easily cause the support portion of the carrier to be supported by the guide portion of the vehicle body in a state in which the operation of lifting the carrier is stopped by the positioning portion.

Thereafter, the operator can install the carrier in the carrier storage portion of the vehicle body by moving the carrier toward the carrier storage portion of the vehicle body in a state in which the carrier is supported by the guide portion of the vehicle body by the support portion.

As described above, according to the present invention, when the operator operates the carrier placed on ground so as to be lifted and causes the carrier to be supported by the guide portion of the vehicle body, the operation of aligning the height of the carrier with the height of the guide portion of the vehicle body (operation of causing the support portion of the carrier to be located at a position at which the support portion can be supported by the guide portion of the vehicle body) can be easily performed, thus making it possible to improve the workability of attachment to the carrier storage portion of the vehicle body in the carrier.

In the present invention, it is preferable that the guide portion is a guide rail that is provided extending from the carrier storage portion toward an outer side of the vehicle body, and that has an entrance portion provided at outer end portion of the vehicle body, the support portion is a support roller configured to be supported by the guide rail in the entrance portion, to be separated from the guide rail in the entrance portion, and to be movable along the guide rail, and the positioning portion is configured to, when the carrier placed on the ground is operated so as to be lifted, and the support roller has reached the entrance portion, stop the operation of lifting the carrier so as to allow transition to a state in which the support roller is supported by the guide rail from the entrance portion.

According to the present invention, the guide portion of the vehicle body is a guide rail, and the support portion of the carrier is a support roller. Therefore, this configuration is advantageous in terms of simplification of the structures of the guide portion of the vehicle body and the support portion of the carrier.

According to the present invention, as the operator operates the carrier placed on the ground so as to be lifted, the operation of lifting the carrier is stopped by the positioning portion when the support roller of the carrier has reached the entrance portion of the guide rail of the vehicle body.

The operator can easily cause the support roller of the carrier to be supported by the guide rail of the vehicle body from the entrance portion of the guide rail of the vehicle body in a state in which the operation of lifting the carrier is stopped by the positioning portion.

In the present invention, it is preferable that the guide rail is formed to be inclined downward from the entrance portion toward the carrier storage portion so as to descend toward the carrier storage portion.

After causing the support roller of the carrier to be supported by the guide rail of the vehicle body as described above, the operator operates the carrier to move along the guide rail of the vehicle body, thus installing the carrier in the carrier storage portion of the vehicle body.

According to the present invention, the guide rail of the vehicle body is formed to be inclined downward from the entrance portion of the guide rail of the vehicle body toward the carrier storage portion of the vehicle body. Accordingly, the carrier attempts to move toward the carrier storage portion of the vehicle body under its own weight.

This allows the operator to easily operate the carrier to move along the guide rail of the vehicle body, and install the carrier in the carrier storage portion of the vehicle body.

According to the present invention, when the operator operates the carrier to move from the carrier storage portion of the vehicle body to the entrance portion of the guide rail of the vehicle body, and removes the carrier from the vehicle body, the operator needs to operate the carrier to move against a state in which the carrier attempts to move toward the carrier storage portion of the vehicle body under its own weight.

In this case, the operator, who is standing outward of the vehicle body relative to the carrier storage portion of the vehicle body, performs the moving operation while pulling the carrier. For the operator, it is easier to exert a large force on the carrier for pulling than pushing, and therefore the operation of removing the carrier from the vehicle body hardly is of little burden to the operator.

In the present invention, it is preferable that a resistance portion is provided that is configured to, when the carrier is operated to move from the carrier storage portion toward an outer side of the vehicle body and has reached a position immediately in front of the entrance portion, provide resistance to the operation of moving the carrier.

According to the present invention, in the case where the operator operates the carrier to move from the carrier storage portion of the vehicle body to the entrance portion of the guide rail of the vehicle body, and removes the carrier from the vehicle body, resistance is generated to the operation of moving the carrier when the carrier has reached a position immediately in front of the entrance portion of the guide rail of the vehicle body. Therefore, the operator can easily recognize that the carrier has reached a position immediately in front of the entrance portion of the guide rail of the vehicle body.

Accordingly, the operator can operate the support roller of the carrier to move to the entrance portion of the guide rail of the vehicle body and separate the support roller from the guide rail of the vehicle body while recognizing the position of the carrier, thus effortlessly removing the carrier from the vehicle body.

In the present invention, it is preferable that the resistance portion is an opening that allows entry and exit of the support roller.

According to the present invention, in the case where the operator operates the carrier to move toward the entrance portion of the guide rail of the vehicle body after the support roller of the carrier has entered the opening, resistance is generated when the support roller of the carrier is pulled out from the opening.

Accordingly, a suitable level of resistance that does not impose a burden on the operator can be generated to the operation of moving the carrier. Since the configuration of the resistance portion can be simplified with the opening, this configuration is advantageous in terms of simplification of the structure.

In the present invention, it is preferable that a stopper portion is provided that is configured to, when the carrier is operated to move from the carrier storage portion toward an outer side of the vehicle body and has reached the entrance portion, stop the operation of moving the carrier.

According to the present invention, in the case where the operator operates the carrier to move from the carrier storage portion of the vehicle body to the entrance portion of the guide rail of the vehicle body and removes the carrier from the vehicle body, the operation of moving the carrier is stopped when the carrier has reached the entrance portion of the guide rail of the vehicle body. Therefore, the operator can easily recognize that the carrier has reached the entrance portion of the guide rail of the vehicle body.

Accordingly, the operator can separate the support roller of the carrier from the entrance portion of the guide rail of the vehicle body while recognizing the position of the carrier, thus effortlessly removing the carrier from the vehicle body.

In the present invention, it is preferable that the stopper portion is configured to stop the operation of moving the carrier by abutting against the support roller.

According to the present invention, the configuration of the stopper portion can be simplified by configuring the stopper portion so as to stop the operation of moving the carrier by abutting against the support roller of the carrier that moves along the guide rail of the vehicle body. Therefore, this configuration is advantageous in terms of simplification of the structure.

BRIEF DESCRIPTION OF THE DRAWINGS

FIG. 13 is a left side view showing a state in which the carrier is removed from the carrier storage portion.
FIG. 14 is a left side view showing a state in which the carrier is removed from the carrier storage portion.

DETAILED DESCRIPTION OF PREFERRED EMBODIMENTS

FIGS. 1 to 14 show an electric riding mower as an example of the electric work vehicle. In FIGS. 1 to 14, "F"

indicates a forward direction, "B" indicates a backward direction, "U" indicates an upper direction, "D" indicates a downward direction, "R" indicates a rightward direction, and "L" indicates a leftward direction.

Overall Configuration of Riding Mower

Figure 1:
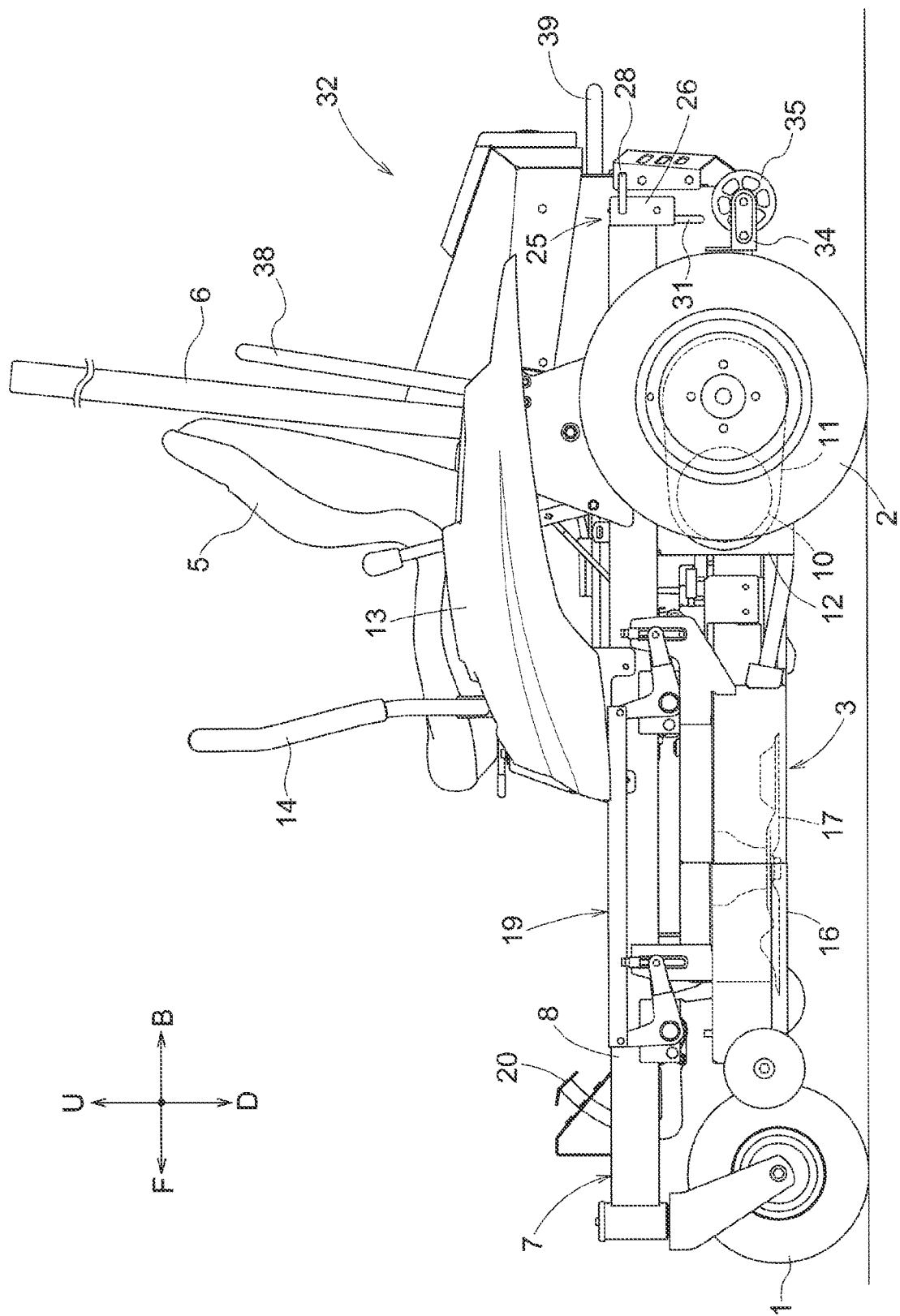
FIG. 1 is a left side view of a riding mower.
Figure 2:
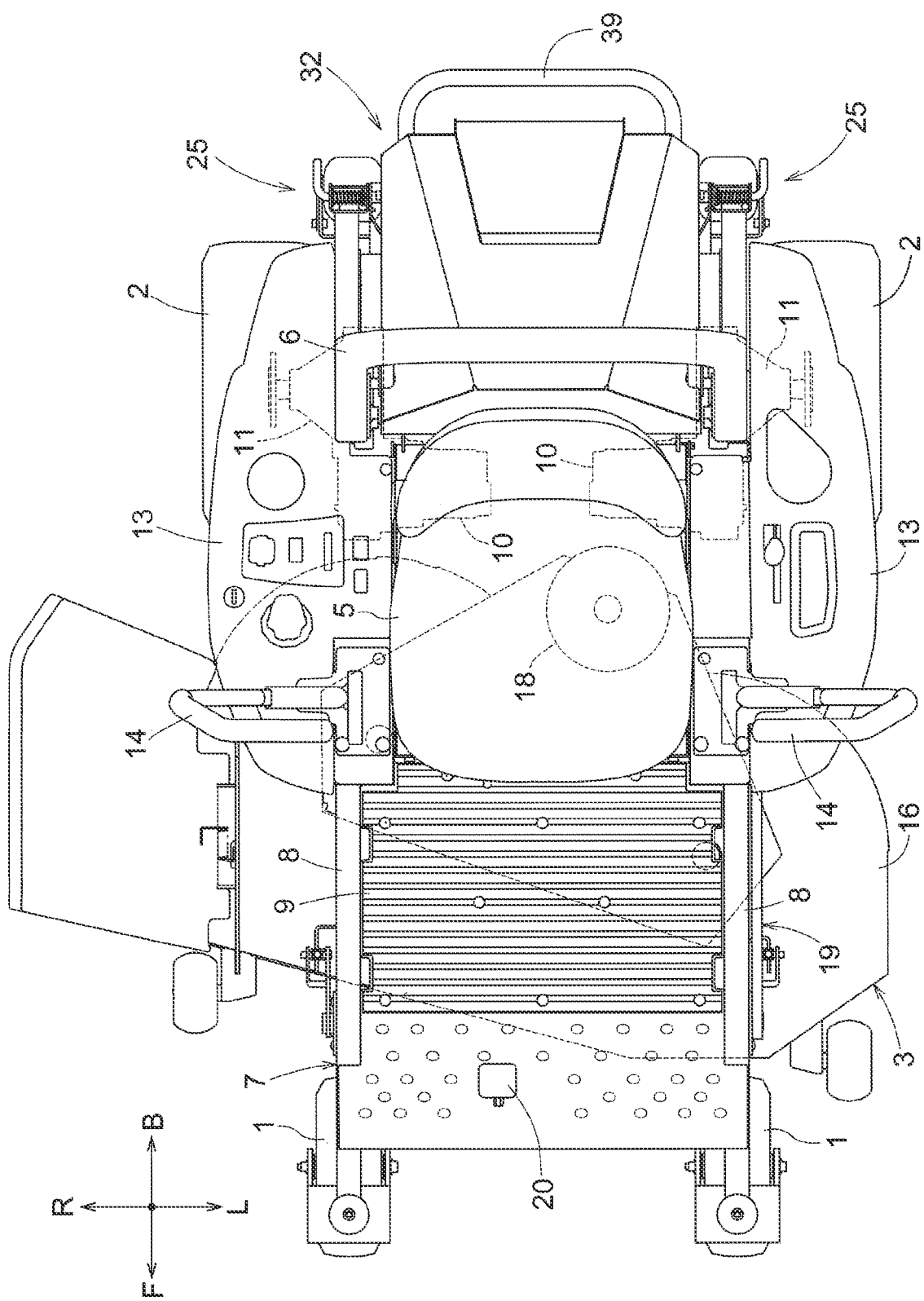
FIG. 2 is a plan view of the riding mower.

As shown in FIGS. 1 and 2, the riding mower includes left and right front wheels 1 supported at a front portion of a vehicle body 7, left and right rear wheels 2 supported at a rear portion of the vehicle body 7, a mower 3 supported between the front wheels 1 and the rear wheels 2 below the vehicle body 7, a carrier storage portion 4 (see FIGS. 3 and 4) supported between the left and right rear wheels 2 at the rear portion of the vehicle body 7, a driver's seat 5 and a ROPS frame 6 supported on the upper side of the vehicle body 7, and so forth.

The vehicle body 7 includes left and right body frames 8 extending along the front-rear direction, and a floor 9 coupled to the left and right body frames 8 so as to span therebetween. The driver's seat 5 is supported by the rear portion of the floor 9. A lower portion of the ROPS frame 6 is coupled to the left and right body frames 8.

Configuration Relating to Front Wheels and Rear Wheels

As shown in FIGS. 1 and 2, the left and right front wheels 1 are each configured as a caster wheel that is freely rotatable about an axis extending in the up-down direction. The left and right front wheels 1 are supported at a front portion of the left and right body frames 8.

Figure 3:
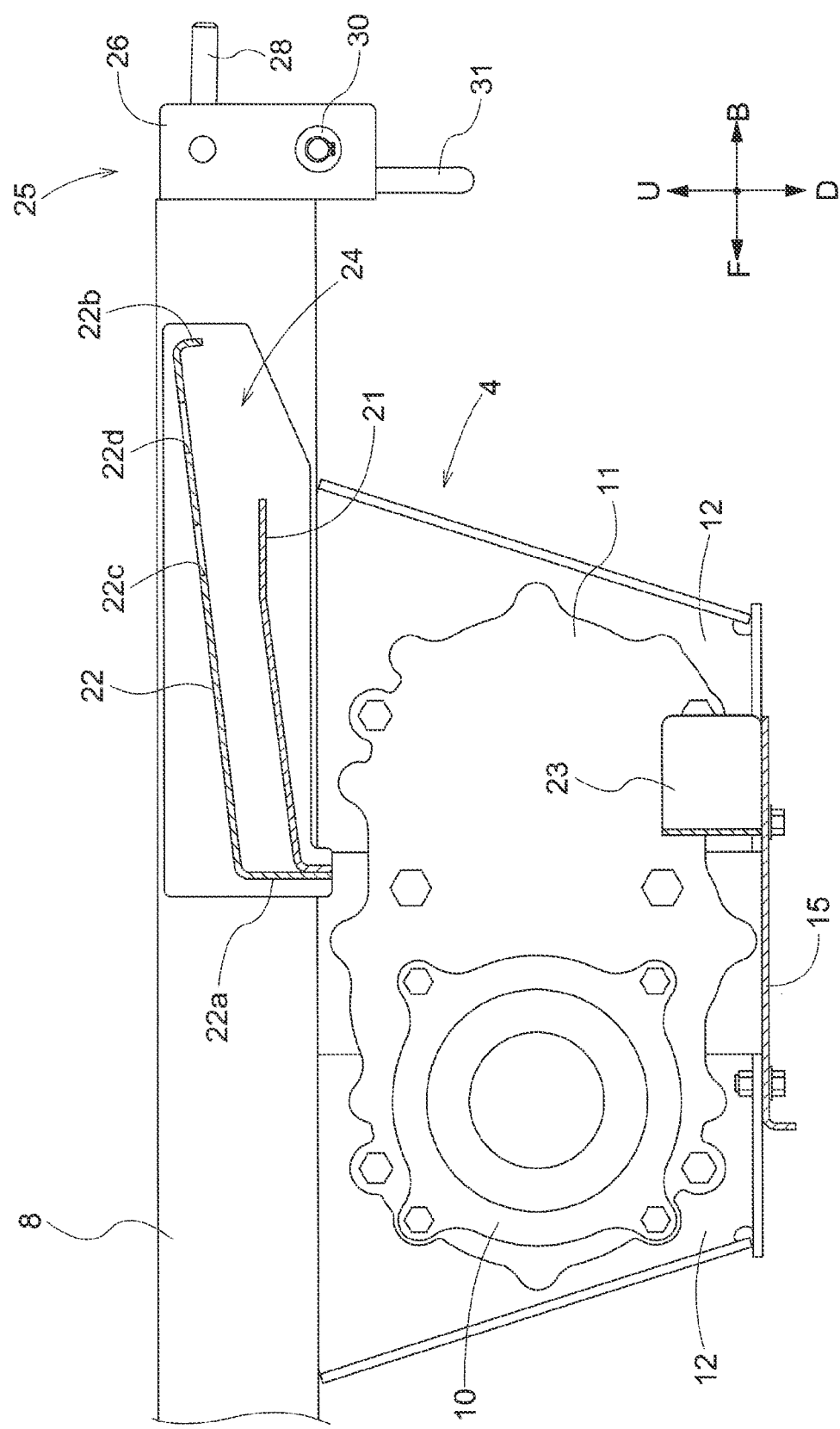
FIG. 3 is a left side view of the vicinity of a carrier storage portion.
Figure 4:
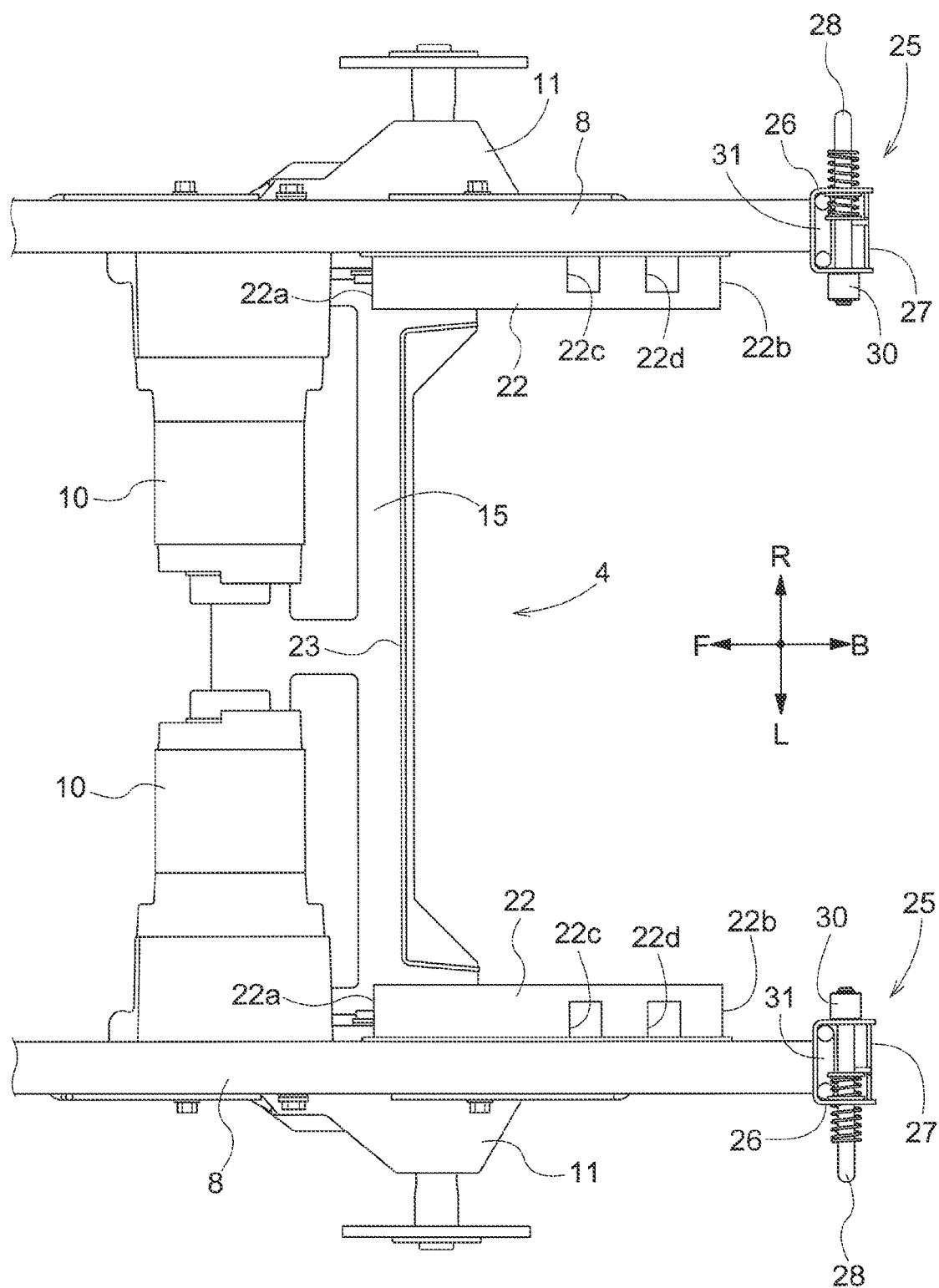
FIG. 4 is a plan view of the vicinity of the carrier storage portion.

As shown in FIGS. 3 and 4, left and right support frames 12 are downwardly coupled to the rear portions of the body frames 8. Left and right electric motors 10 and speed reduction mechanisms 11 are coupled to the support frames 12. The rear wheels 2 are supported by the speed reduction mechanisms 11. The power of the electric motors 10 is transmitted to the rear wheels 2 via the speed reduction mechanisms 11. The left and right rear wheels 2 are rotated independently.

As shown in FIGS. 1 and 2, left and right fenders 13 are provided above the rear wheels 2. Left and right shift levers 14 are provided at front portions of the fenders 13. The shift levers 14 can be operated from a neutral position to a forward side, which is the front side, and to a backward side, which is the rear side.

When the right shift lever 14 is operated to the neutral position, the right electric motor 10 is brought into a stopped state. When the right shift lever 14 is operated to the forward side, the right electric motor 10 is actuated to the forward side. When the right shift lever 14 is operated to the backward side, the right electric motor 10 is actuated to the backward side. When the left shift lever 14 is operated to the neutral position, the forward side, and the backward side, the left electric motor 10 is actuated in the same manner as described above.

As described above, as a result of the left and right shift levers 14 being operated, the left and right rear wheels 2 are rotated independently of each other to the forward side and the backward side, whereby the forward movement, backward movement, and left and right turns of the vehicle body 7 are performed.

Configuration of Mower

As shown in FIGS. 1 and 2, the mower 3 is provided with a mower deck 16, and a cutting blade 17 supported so as to be rotatable about an inner vertical axis of the mower deck 16. The cutting blade 17 is rotated by an electric motor 18.

The mower 3 is supported by the body frames 8 such that the mower 3 can be elevated and lowered by a link mechanism 19. An electric actuator (not shown) that actuates the link mechanism 19 to be elevated and lowered, and an operation pedal 20 that actuates the electric actuator are provided.

The electric actuator is actuated by the operation pedal 20 being pressed down with a foot, thus allowing the mower 3 to be elevated and lowered to a non-work position (see FIG. 1) elevated from the ground, and a work position in contact with the ground.

Configuration of Carrier Storage Portion

As shown in FIGS. 3 and 4, the carrier storage portion 4 is formed rearward of the electric motors 10 at a rear portion (on the rear side relative to the driver's seat 5 and the ROPS frame 6) of the vehicle body 7 between the left and right rear wheels 2 (speed reduction mechanisms 11) and between the left and right body frames 8.

A flat plate-shaped support frame 15 is coupled to lower portions of the left and right support frames 12 so as to span therebetween. A flat plate-shaped stopper portion 23 is coupled to the support frame 15. Consequently, the carrier storage portion 4 is open rearward, downward, and upward.

Configuration of First Guide Rails and Second Guide Rails

As shown in FIGS. 3 and 4, the left and right first guide rails 21 (corresponding to a guide rail) (corresponding to a guide portion) each formed by a flat plate-shaped plate material are coupled to rear inner portions of the body frames 8 along the front-rear direction.

Left and right second guide rails 22 (corresponding to a guide rail) (corresponding to a guide portion) each formed by a flat plate-shaped plate material are coupled to the rear inner portions of the body frames 8 at positions on the upper side of the first guide rails 21 along the front-rear direction.

A front end portion of each of the second guide rails 22 is bent downward and coupled to a front end portion of the corresponding first guide rail 21. The front end portion of the second guide rail 22 forms a stopper portion 22*a*. A rear end portion of each of the second guide rails 22 is bent downward. The rear end portion of the second guide rail 22 forms a stopper portion 22*b*. Two openings 22*c* and 22*d* (corresponding to a resistance portion) are open at positions of the second guide rail 22 that are located slightly forward of the stopper portion 22*b*.

A rear end portion of each of the first guide rails 21 is disposed forward relative to the stopper portion 22*b* of the corresponding second guide rail 22. An entrance portion 24 is provided between the rear end portion of the first guide rail 21 and the stopper portion 22*b* of the second guide rail 22.

With the above-described configuration, the first guide rails 21 and the second guide rails 22 are provided extending from the carrier storage portion 4 toward the rear (outer side) of the vehicle body 7, and have the entrance portions 24 provided at the rear (outer) end portion of the vehicle body 7.

In a state in which the front wheels 1 and the rear wheels 2 are in contact with the ground, the body frames 8 are parallel (horizontal) to the ground. The first guide rails 21 and the second guide rails 22 are formed to be inclined downward from the entrance portions 24 toward the carrier storage portion 4 in a side view so as to descend toward the carrier storage portion 4.

Figure 5:
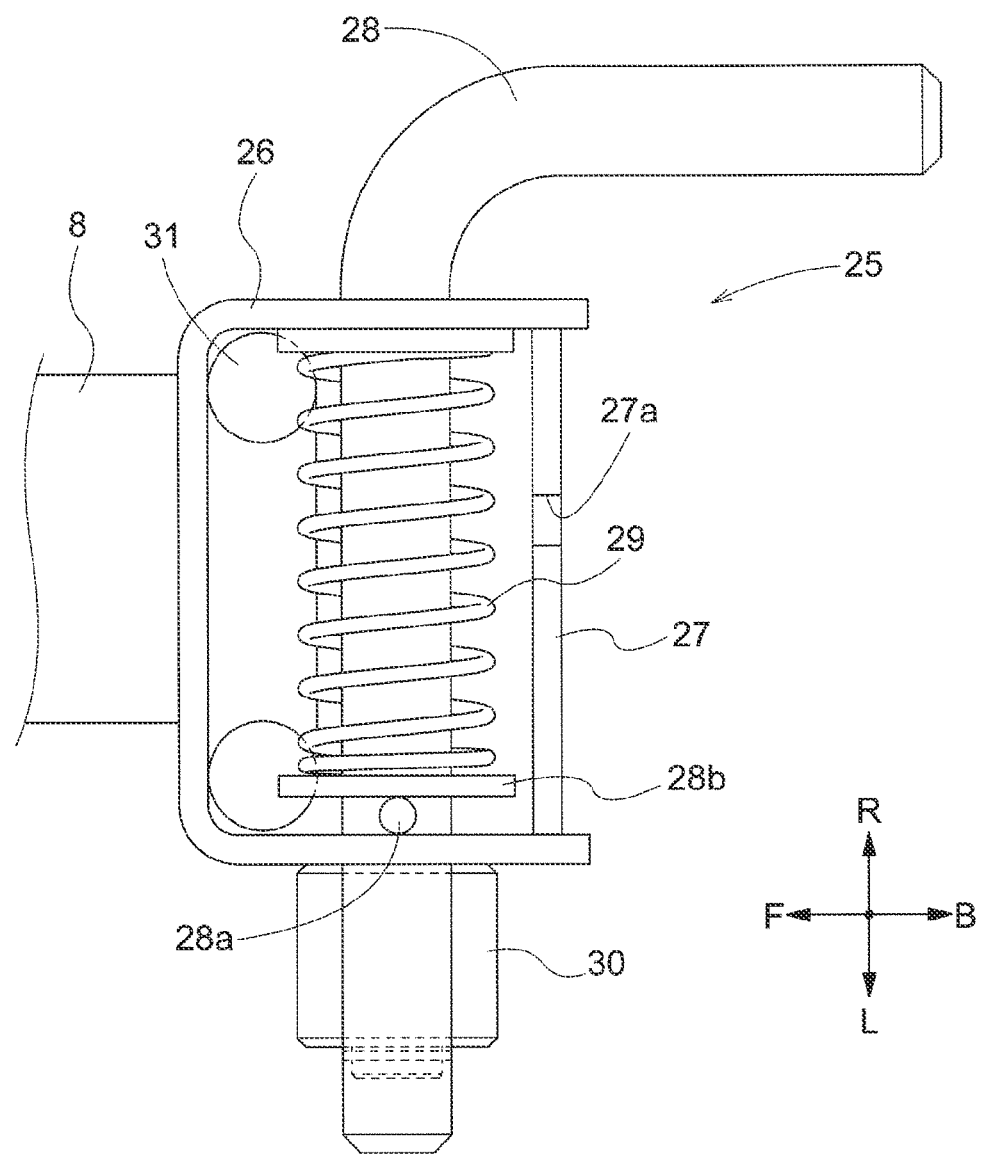
FIG. 5 is a plan view of a holding mechanism.

Configuration of Holding Mechanisms Capable of Holding Carrier in Carrier Storage Portion As shown in FIGS. 3, 4, and 5, left and right holding mechanisms 25 are provided at rear end portions of the body frames 8.

Support members 26 each having a channel shape in a plan view are coupled to the rear end portions of the body frames 8 so as to face backward. A flat plate-shaped support member 27 is coupled to each of the support members 26. A recess 27a in the form of an upwardly open cut-out portion is formed in an upper side portion of the support member 27.

A holding pin 28 that is bent into an angular shape is supported by each of the support members 26 so as to be slidable along the left-right direction. A spring receiving pin 28a and a spring receiving plate 28b are attached to each of the holding pins 28. A spring 29 is provided between the support member 26 and the spring receiving plate 28b of each of the holding pins 28.

In each holding mechanism 25, the holding pin 28 is biased by the spring 29 so as to protrude toward the center in the left-right direction of the vehicle body 7. The operator holds an outer portion of the holding pin 28, operates the holding pin 28 to slide outward against the spring 29, and rotates the holding pin 28 by about 90 degrees to place the spring receiving pin 28a of the holding pin 28 in the recess 27a of the support member 27, whereby the holding pin 28 is held in a state in which it has been operated to the outer side.

As described above, the holding mechanisms 25 each include the support members 26 and 27, the holding pin 28, the spring 29, and so forth.

In the holding mechanisms 25, left and right support rollers 30 are supported at inner portions of the support members 26 so as to be rotatable about an axis extending along the left-right direction. Left and right hooks 31 for traction each having a U-shape in a rear view are coupled to lower portions of the support members 26 so as to face downward.

Configuration of Carrier Held in Carrier Storage Portion

Figure 6:
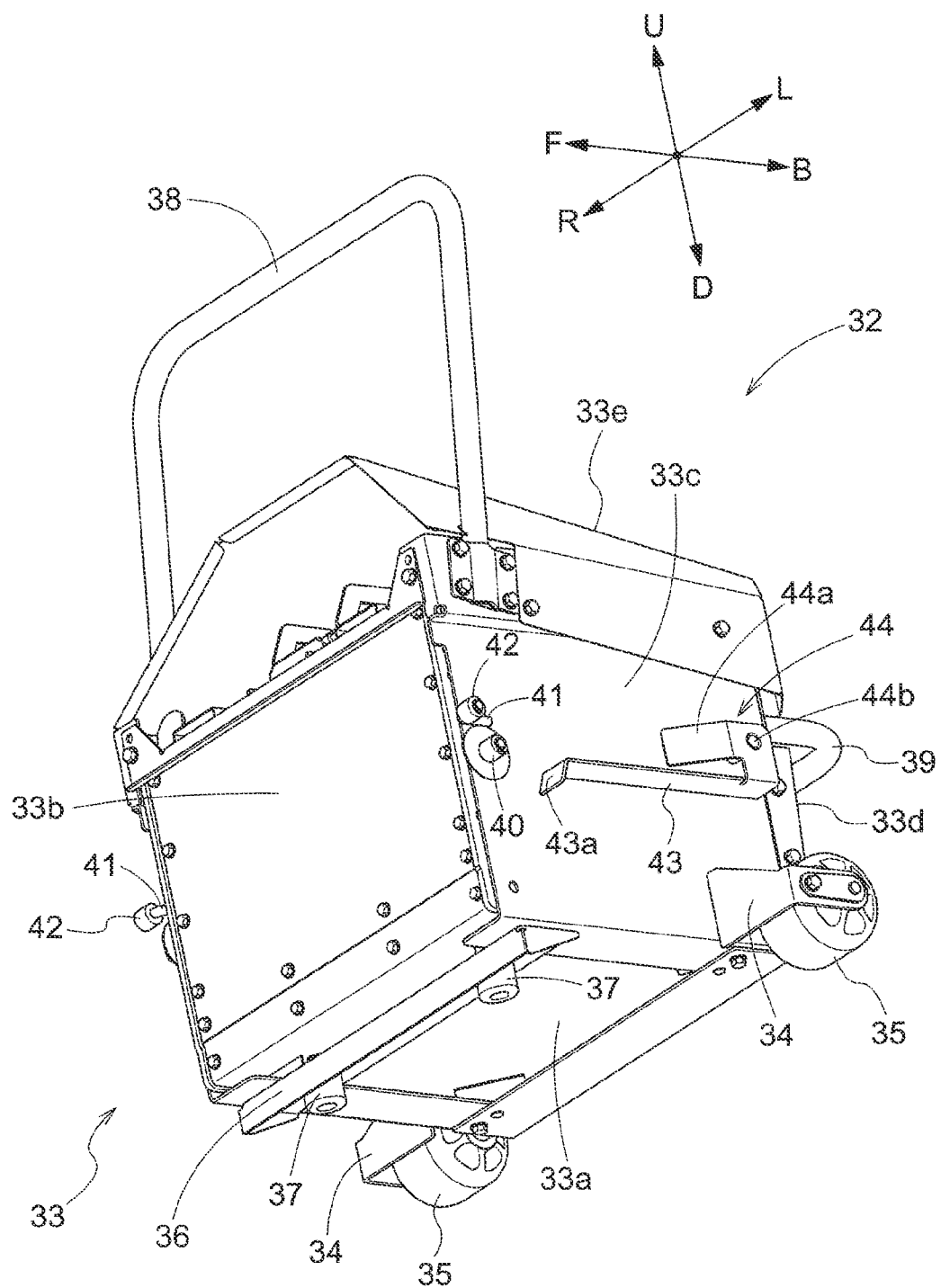
FIG. 6 is a perspective view of a carrier.
Figure 7:
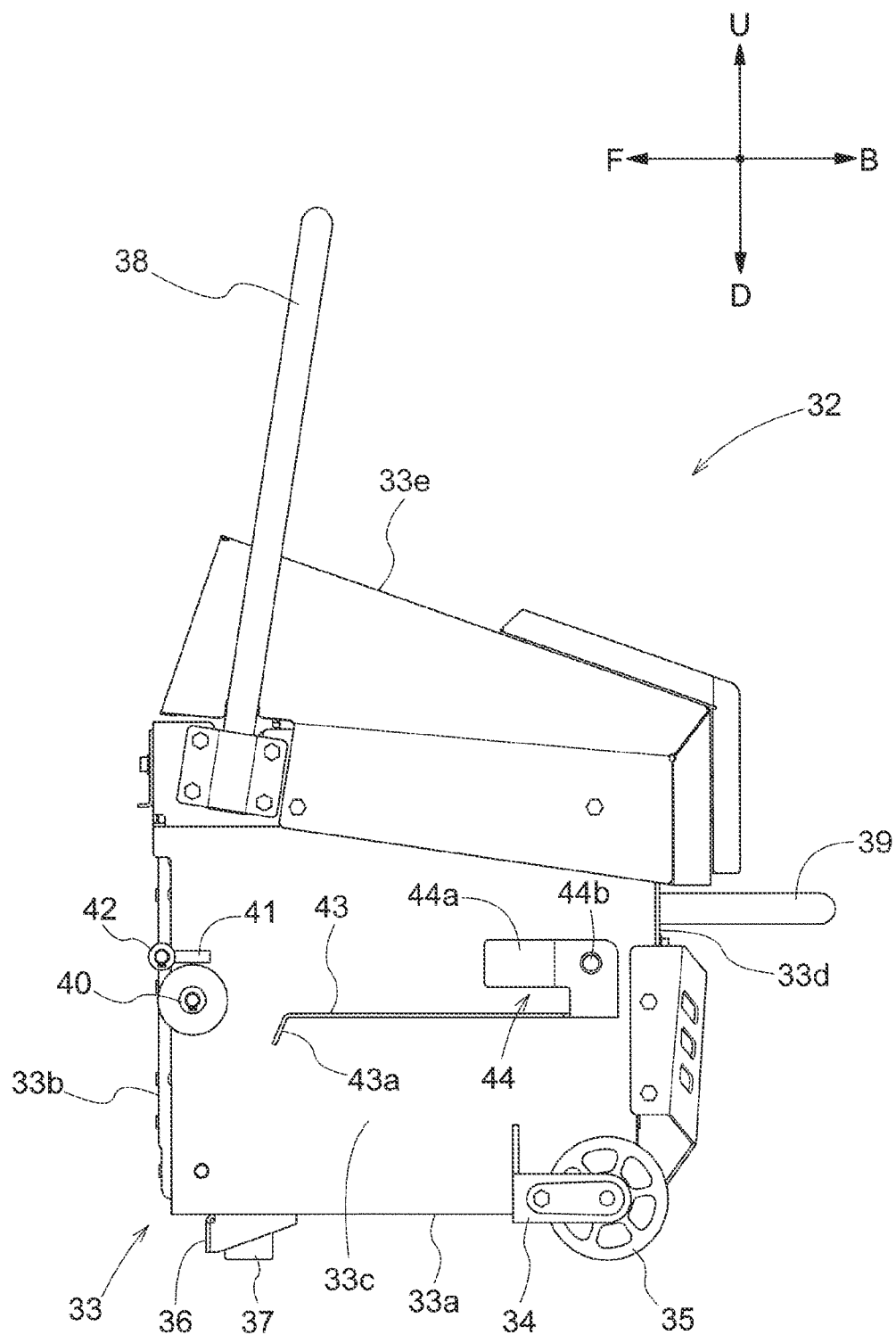
FIG. 7 is a left side view of the carrier.

As shown in FIGS. 6 and 7, the carrier 32 is configured such that a battery (not shown) can be housed inside a main body portion 33 and can be replaced therefrom.

The main body portion 33 is configured in a box shape including a bottom portion 33a, a front wall portion 33b, left and right lateral wall portions 33c, a rear wall portion 33d, and a ceiling portion 33e. Left and right brackets 34 are coupled to lower rear portions of the respective corresponding lateral wall portions 33c of the main body portion 33. Left and right wheels 35 are supported by the respective corresponding brackets 34 so as to be freely rotatable about an axis extending in the left-right direction.

An angular receiving plate 36 is coupled to a front portion of the bottom portion 33a of the main body portion 33 along the left-right direction. Left and right ground contact portions 37 made of hard rubber are attached to left and right portions of the receiving plate 36, and protrude slightly below the receiving plate 36.

An arch-shaped handle 38 is coupled to upper front portions of the lateral wall portions 33c of the main body portion 33 so as to span therebetween, and disposed above the ceiling portion 33e of the main body portion 33. A handle 39 is coupled to left and right portions of the rear wall portion 33d of the main body portion 33 so as to span therebetween, and extends rearward from the rear wall portion 33d of the main body portion 33.

Left and right support rollers 40 (corresponding to a support portion) are supported at front portions of the respective corresponding lateral wall portions 33c of the main body portion 33 so as to be rotatable about an axis extending along the left-right direction.

Left and right angular support arms 41 are coupled to upper portions relative to the support rollers 40 on the respective corresponding lateral wall portions 33c of the main body portion 33. Left and right positioning rollers 42 (corresponding to a positioning portion) are supported by the respective corresponding support arms 41 so as to be rotatable about an axis extending along the left-right direction. Each positioning roller 42 is disposed slightly upward of the support roller 40, and slightly forward of the support roller 40 (on the front wall portion 33b side of the main body portion 33) in a side view.

Left and right support rails 43 having a flat plate shape are coupled to rearward portions relative to the support rollers 40 on the respective corresponding lateral wall portions 33c of the main body portion 33 along the front-rear direction. A front end portion of each of the support rails 43 is bent downward. The front end portion of the support rail 43 forms a receiving portion 43a.

Left and right holding portions 44 are coupled to rear end portions of the support rails 43 on the respective corresponding lateral wall portions 33c of the main body portion 33. At a front portion of each of the holding portions 44, an inclined portion 44a is provided over the corresponding lateral wall portion 33c of the main body portion 33, and a pipe portion 44b extending along the left-right direction is provided over the corresponding lateral wall portion 33c of the main body portion 33, at a rearward portion relative to the inclined portion 44a.

Figure 8:
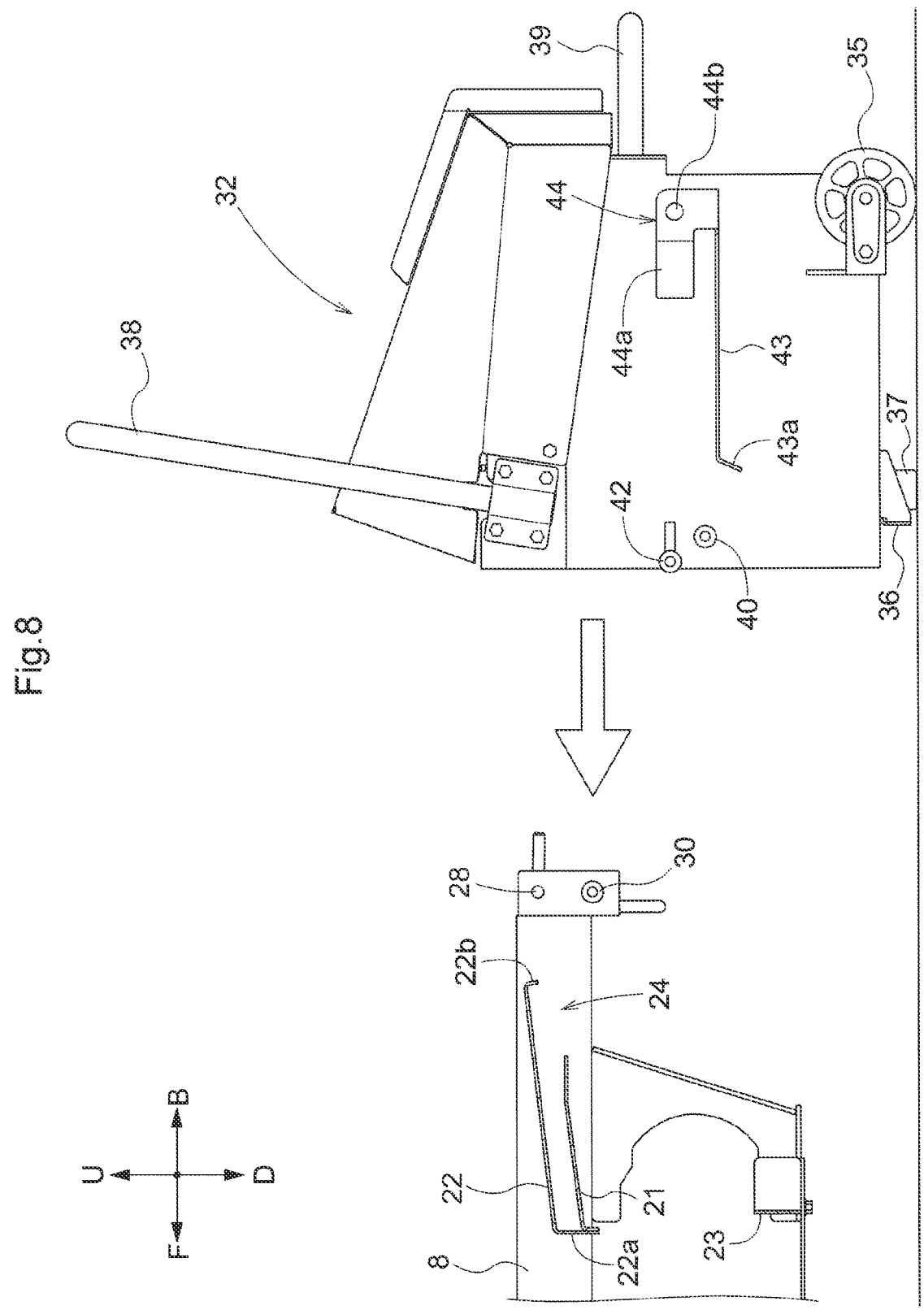
FIG. 8 is a left side view showing a state in which the carrier is installed in the carrier storage portion.

Transition to State in which Support Rollers of Carrier are Supported by First Guide Rails and Second Guide Rails in Installation of Carrier in Carrier Storage Portion The state shown in FIG. 8 is a state in which the carrier 32 is placed on the ground located rearward of the vehicle body 7 (carrier storage portion 4), and the wheels 35 and the ground contact portions 37 of the carrier 32 are in contact with the ground.

From the state shown in FIG. 8, the operator operates a front portion of the carrier 32 so as to be lifted from the ground while holding the handles 38 and 39 of the carrier 32, and operates the carrier 32 to move forward toward the vehicle body 7 (carrier storage portion 4) using the wheels 35 so as to place the front portion of the carrier 32 between the left and right body frames 8.

Figure 9:
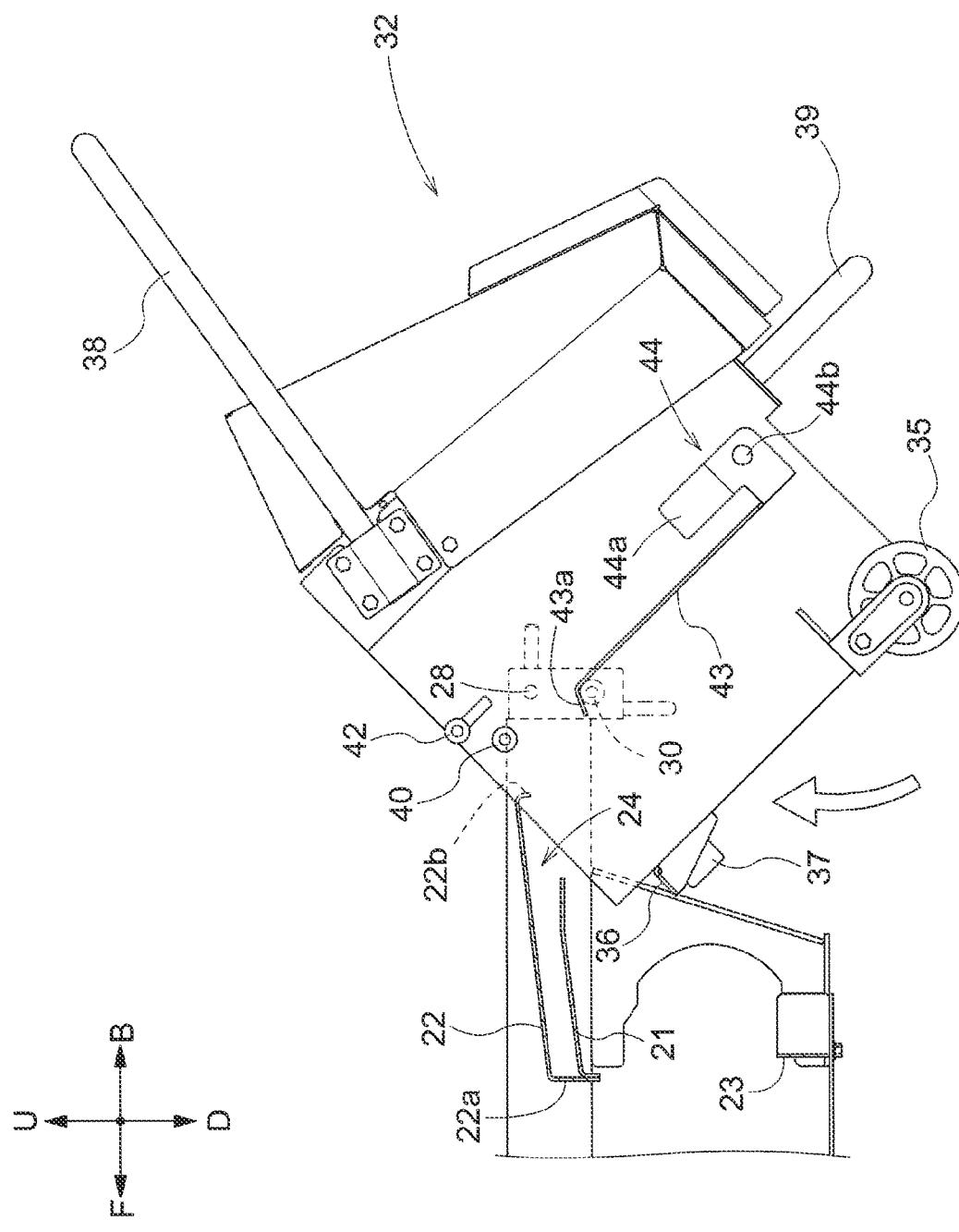
FIG. 9 is a left side view showing a state in which the carrier is installed in the carrier storage portion.

As shown in FIG. 9, the operator engages each of the receiving portions 43a of the support rails 43 of the carrier 32 with the corresponding support roller 30 while placing the receiving portion 43a between the holding pin 28 of the holding mechanism 25 and the support roller 30. In the state shown in FIG. 9, the support roller 40 of the carrier 32 is located at a position in proximity to the rear side of the stopper portion 22b of the second guide rail 22, and the positioning roller 42 of the carrier 32 is located rearward of and higher than the stopper portion 22b of the second guide rail 22.

In the state shown in FIG. 9, even if the operator attempts to operate the carrier 32 to move forward, the support rollers 40 of the carrier 32 abut against the stopper portions 22b of the second guide rails 22, whereby the operation of moving the carrier 32 forward is stopped. This stops the transition to a state in which the support rollers 40 of the carrier 32 are supported by the first guide rails 21 and the second guide rails 22.

Figure 10:
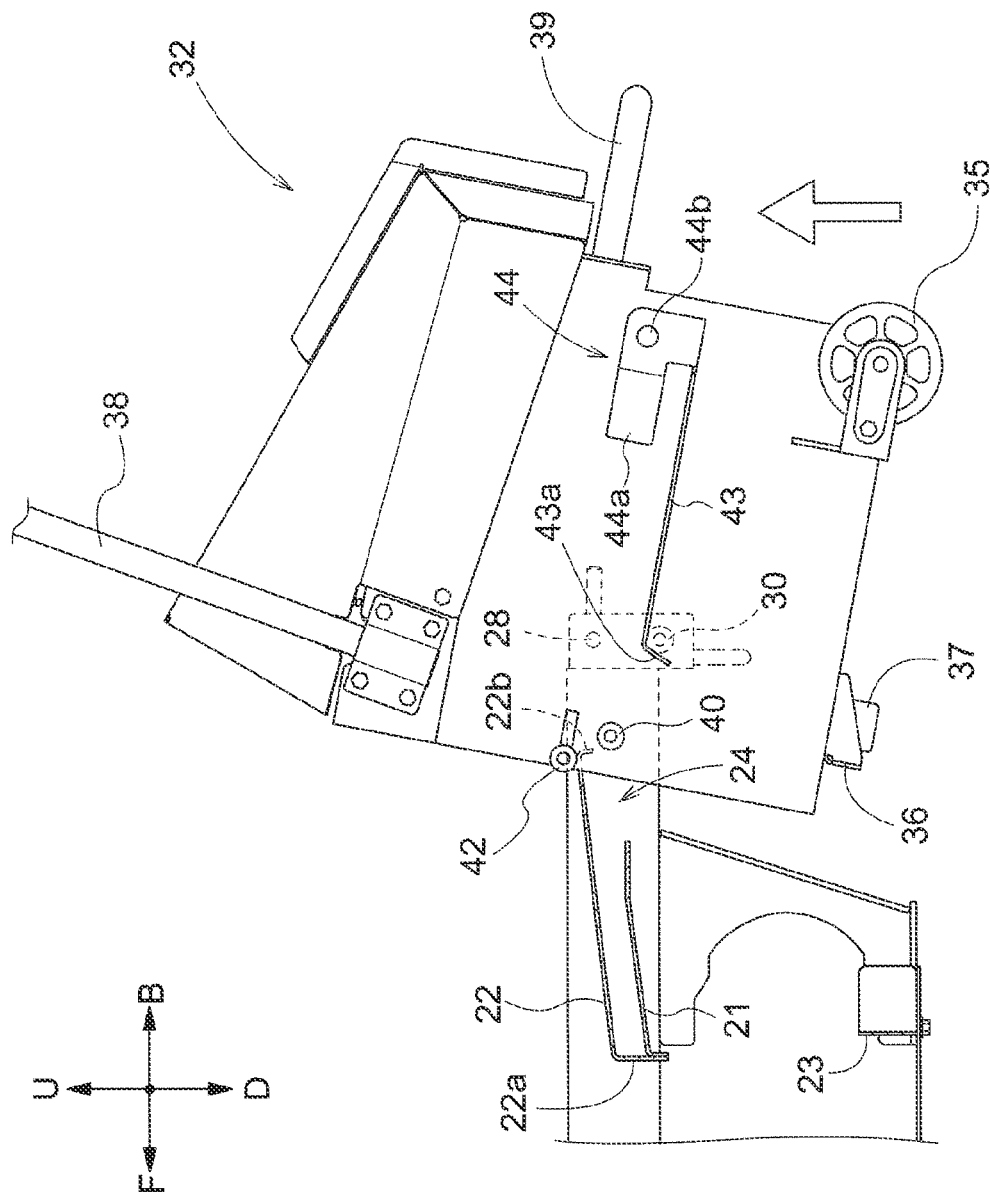
FIG. 10 is a left side view showing a state in which the carrier is installed in the carrier storage portion.

As shown in FIGS. 9 and 10, the operator operates the rear portion of the carrier 32 so as to be lifted from the ground while holding the handles 38 and 39 of the carrier 32. In this case, the receiving portions 43a of the support rails 43 of the carrier 32 are engaged with the support rollers 30, and therefore the rear portion of the carrier 32 is operated so as to be lifted from the ground with the support rollers 30 serving as a fulcrum. The carrier 32 will not move rearward, and the receiving portions 43a of the support rails 43 of the carrier 32 will not disengage from the support rollers 30.

As shown in FIGS. 9 and 10, when the rear portion of the carrier 32 is operated so as to be lifted from the ground with the support rollers 30 serving as a fulcrum, the support rollers 40 and the positioning rollers 42 of the carrier 32 move downward with the support rollers 30 serving as a fulcrum.

As shown in FIG. 10, when each of the support rollers 40 of the carrier 32 has reached a position (the position of the entrance portion 24) slightly below the stopper portion 22b of the corresponding second guide rail 22 through the operation of lifting the rear portion of the carrier 32, the support roller 40 of the carrier 32 is located at a position at which the support roller 40 can be supported by the first guide rail 21 and the second guide rail 22.

In the state shown in FIG. 10, each of the positioning rollers 42 of the carrier 32 abuts against an upper surface of the corresponding second guide rail 22, and the operation of lifting the rear portion of the carrier 32 is stopped. This allows the transition to a state in which the support rollers 40 of the carrier 32 are supported by the first guide rails 21 and the second guide rails 22.

Figure 11:
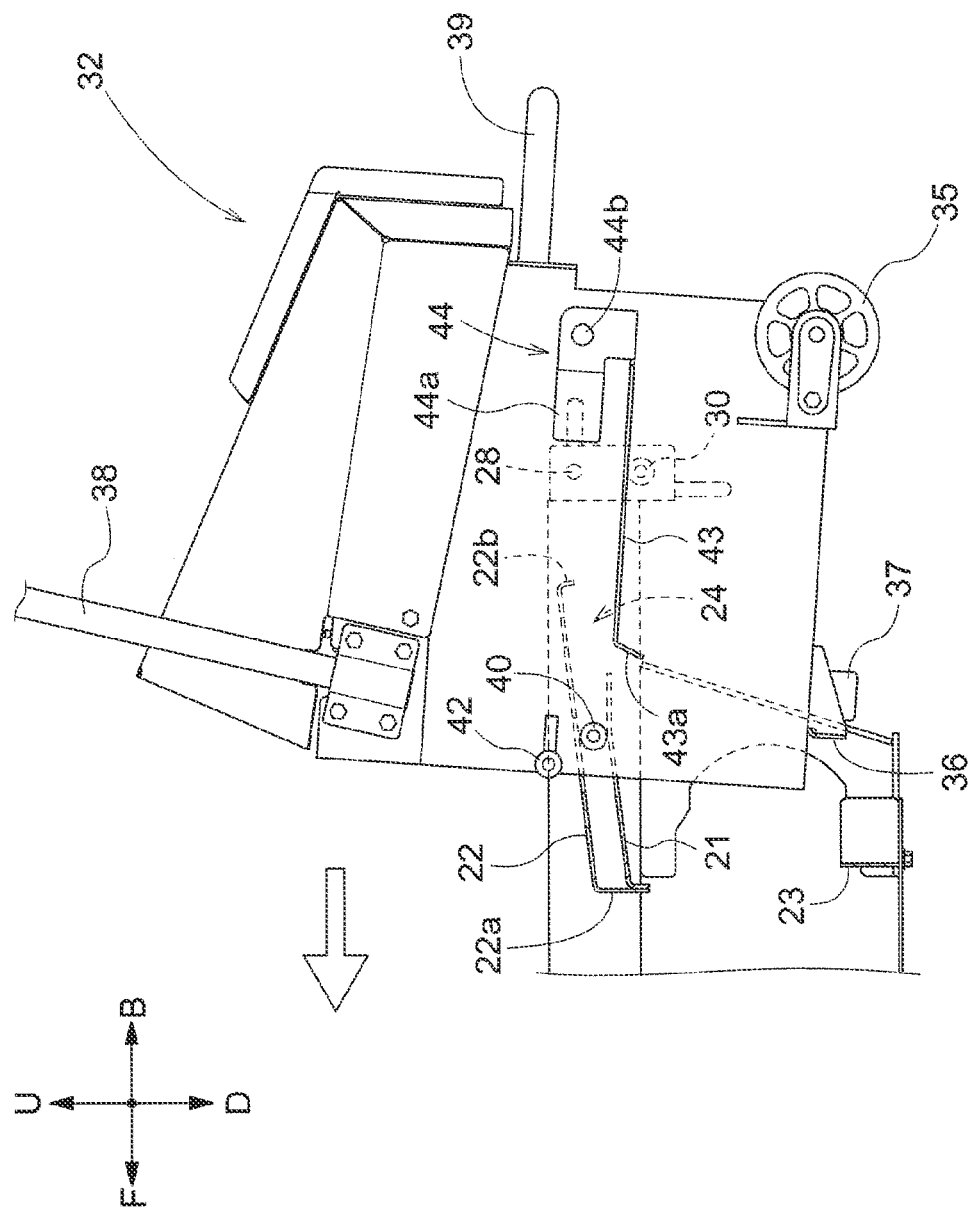
FIG. 11 is a left side view showing a state in which the carrier is installed in the carrier storage portion.

State in which Carrier is Moved to Carrier Storage Portion, while being Supported by First Guide Rails and Second Guide Rails, in Installation of Carrier in Carrier Storage Portion As shown in FIG. 10, in a state in which the transition to a state in which the support rollers 40 of the carrier 32 are supported by the first guide rails 21 and the second guide rails 22 is allowed, the operator holds the handles 38 and 39 of the carrier 32, and operates the carrier 32 to move forward while preventing the positioning rollers 42 of the carrier 32 from being separated upward from the upper surfaces of the second guide rails 22, as shown in FIG. 11.

Consequently, each of the support rollers 40 of the carrier 32 enters between the corresponding first guide rail 21 and the corresponding second guide rail 22 from the entrance portion 24, while the carrier 32 is supported by the support rollers 30 via the support rails 43.

Even when the rear portion of the carrier 32 is to be lowered with the support rollers 30 serving as a fulcrum in a state in which the center of gravity of the carrier 32 is located rearward of the support rollers 30 in a side view, the support rollers 40 of the carrier 32 abut against the lower surfaces of the second guide rails 22. Therefore, the rear portion of the carrier 32 will not be lowered. Even when the carrier 32 attempts to move rearward, the support rollers 40 of the carrier 32 abut against the stopper portions 22b of the second guide rails 22. Therefore, rearward movement of the carrier 32 is stopped.

Accordingly, in a state in which the center of gravity of the carrier 32 is located rearward relative to the support rollers 30 in a side view, the carrier 32 is supported by the support rollers 30 via the support rails 43, and the carrier 32 is supported by the support rollers 40 via the second guide rails 22.

When the operator operates the carrier 32 to move forward from the state shown in FIG. 10, the support rollers 40 of the carrier 32 enter and exit the openings 22c and 22d (see FIGS. 3 and 4) of the second guide rails 22. Consequently, a small amount of resistance is generated to the operation of moving the carrier 32 forward. This allows the operator to easily recognize that the support rollers 40 of the carrier 32 are supported by the second guide rails 22.

When the center of gravity of the carrier 32 is brought into a state of being located forward relative to the support rollers 30 in a side view as a result of the operator operating the carrier 32 to move forward, the front portion of the carrier 32 is brought into a state of being lowered with the support rollers 30 serving as a fulcrum. In this state, the carrier 32 is supported by the support rollers 30 via the support rails 43, and the carrier 32 is supported by the support rollers 40 via the first guide rails 21.

The first guide rails 21 and the second guide rails 22 are each formed to be inclined downward from the entrance portion 24 toward the carrier storage portion 4 in a side view (see "Configuration of First Guide Rails and Second Guide Rails" described above).

Accordingly, the carrier 32 attempts to move toward the carrier storage portion 4 under its own weight, and the operator can easily operate the carrier 32 to move forward toward the carrier storage portion 4 along the first guide rails 21 and the second guide rails 22.

State of Carrier in Carrier Storage Portion in Installation of Carrier in Carrier Storage Portion When the carrier 32 is operated to move forward by the operator, and the carrier 32 has reached a position in front of the carrier storage portion 4, the inclined portions 44a of the holding portions 44 of the carrier 32 abut against the holding pins 28 of the holding mechanisms 25. The holding pins 28 of the holding mechanisms 25 are pressed against the springs 29 by the inclined portions 44a of the holding portions 44 of the carrier 32.

Figure 12:
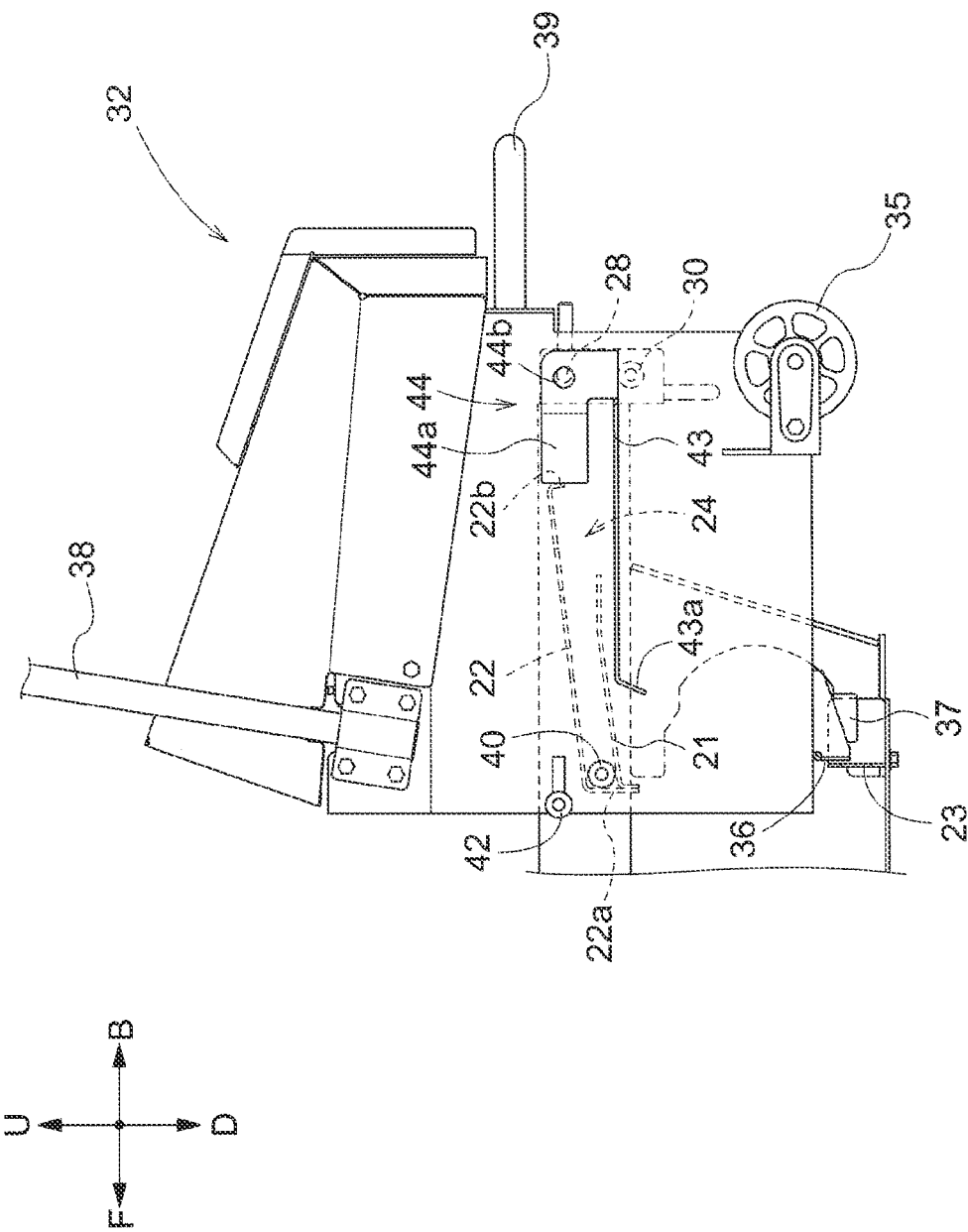
FIG. 12 is a left side view showing a state in which the carrier has been installed in the carrier storage portion.

As shown in FIG. 12, when the holding pins 28 of the holding mechanisms 25 have reached the pipe portions 44b of the holding portions 44 of the carrier 32, the springs 29 cause the holding pins 28 of the holding mechanisms 25 to automatically enter the pipe portions 44b of the holding portions 44 of the carrier 32.

The state shown in FIGS. 1, 2, and 12 is the state in which the carrier 32 is installed and held in the carrier storage portion 4. In this state, the carrier 32 that has been operated so as to be lifted from the ground is supported by the first guide rails 21 and the second guide rails 22 via the support rollers 40 in the state of being lifted from the ground, and the carrier 32 is guided from the rear (outer side) of the vehicle body 7 toward the carrier storage portion 4.

As shown in FIGS. 1, 2, and 12, in the state in which the carrier 32 is installed and held in the carrier storage portion 4, the carrier 32 is supported in the state of being lifted from the ground by the first and second guide rails 21 and 22 and the support rollers 40, and the support rollers 30 and the support rails 43.

The support rollers 40 of the carrier 32 are in contact with the stopper portions 22a of the second guide rails 22, and the receiving plate 36 of the carrier 32 is in contact with the stopper portion 23. The holding pins 28 of the holding mechanisms 25 enter the pipe portions 44b of the holding portions 44 of the carrier 32, and the carrier 32 is held in the carrier storage portion 4.

Removal of Carrier from Carrier Storage Portion

When removing the carrier 32 installed in the carrier storage portion 4, the operator holds outer portions of the holding pins 28 in the holding mechanisms 25, outwardly slides the holding pins 28 against the springs 29, and pulls the holding pins 28 out of the pipe portions 44b of the holding portions 44 of the carrier 32. The operator places the spring receiving pins 28a of the holding pins 28 in the recesses 27a of the support members 27 by rotating the holding pins 28 by about 90 degrees, and holds the holding pins 28 in the state of being operated outward (see "Configuration of Holding Mechanism Capable of Holding Carrier in Carrier Storage Portion" described above).

As shown in FIGS. 12 and 13, the operator operates the carrier 32 to move rearward from the carrier storage portion 4. The first guide rails 21 and the second guide rails 22 are formed to be inclined downward from the entrance portions 24 toward the carrier storage portion 4 in a side view (see "Configuration of First Guide Rails and Second Guide Rails" described above). Therefore, the operator needs to operate the carrier 32 to move rearward against the state in which the carrier 32 attempts to move toward the carrier storage portion 4 under its own weight.

In this case, the operator, who is standing rearward (outward) of the vehicle body 7 relative to the carrier storage portion 4, pulls the carrier 32 rearward by holding the handle 39 of the carrier 32. Accordingly, the operation of moving the carrier 32 rearward is of little burden to the operator.

As shown in FIGS. 12 and 13, when the center of gravity of the carrier 32 is brought into a state of being located rearward relative to the support rollers 30 in a side view, the support rollers 40 of the carrier 32 abut against the lower surfaces of the second guide rails 22 even when the rear portion of the carrier 32 is to be lowered with the support rollers 30 serving as a fulcrum.

When the support rollers 40 of the carrier 32 have reached positions in front of the stopper portions 22b of the second guide rails 22 through the operation of moving the carrier 32 rearward performed by the operator (corresponding to the state in which the carrier 32 is operated to move from the carrier storage portion 4 toward the outer side of the vehicle body 7 and has reached a position immediately in front of the entrance portions 24), the support rollers 40 of the carrier 32 enter and exit the openings 22c and 22d (see FIGS. 3 and 4) of the second guide rails 22. Consequently, a small amount of resistance is generated to the operation of moving the carrier 32 rearward.

This allows the operator to easily recognize that the carrier 32 (support rollers 40) has reached a position immediately in front of the entrance portions 24 of the first guide rails 21 and the second guide rails 22.

As shown in FIG. 14, when the support rollers 40 of the carrier 32 abut against the stopper portions 22b of the second guide rails 22 through the operation of moving the carrier 32 rearward performed by the operator (corresponding to the state in which the carrier 32 is operated to move from the carrier storage portion 4 toward the outer side of the vehicle body 7 and has reached the entrance portions 24), the operation of moving the carrier 32 rearward is stopped. This allows the operator to easily recognize that the carrier 32 (support rollers 40) has reached the entrance portions 24 of the first guide rails 21 and the second guide rails 22.

Next, the operator slightly lowers the front portion of the carrier 32 while holding the handles 38 and 39, and moves the support rollers 40 of the carrier 32 out of the entrance portions 24 so as to be disengaged from the stopper portions 22b of the second guide rails 22, thus bringing the carrier 32 into the state shown in FIG. 10. Next, the carrier 32 is brought into the state shown in FIG. 9, and the carrier 32 is removed from the vehicle body 7 as shown in FIG. 8.

As described above, the carrier 32 is supported in the state of being lifted from the ground by the first guide rails 21 and the second guide rails 22 via the support rollers 40, and is guided from the carrier storage portion 4 toward the rear (outer side) of the vehicle body 7 so as to be removed from the vehicle body 7 and be placed on the ground.

First Alternative Embodiment of the Invention

It is possible to adopt a configuration in which the carrier storage portion 4 is provided between the left and right front wheels 1 at the front portion of the vehicle body 7, and the carrier 32 can be attached or removed to and from the carrier storage portion 4 from the front (outer side) of the vehicle body 7. This configuration allows a work apparatus (not shown) to be supported at the rear portion of the vehicle body 7.

Second Alternative Embodiment of the Invention

It is possible to adopt a configuration in which the first guide rails 21 and the second guide rails 22 are in a horizontal orientation in a side view in a state in which the front wheels 1 and the rear wheels 2 are in contact with the ground.

Third Alternative Embodiment of the Invention

A plurality of support rollers (not shown) may be provided on the vehicle body 7 so as to constitute the guide portion, and guide rails (not shown) may be provided on the carrier 32 so as to constitute the support portion.

Fourth Alternative Embodiment of the Invention

In place of the openings 22c and 22d of the second guide rails 22, small protrusions (not shown) may be provided on the second guide rails 22 and the body frames 8, and the protrusions may constitute the resistance portion.

Fifth Alternative Embodiment of the Invention

Protrusions (not shown) separate from the rear end portions of the second guide rails 22 may be provided on the body frames 8, and the protrusions may constitute the stopper portion.

The present invention is applicable not only to a riding mower, but also to an electric work vehicle such as a tractor that performs work while traveling with a battery mounted therein.

What is claimed is:
1. An electric work vehicle comprising:
a vehicle body capable of traveling;
a carrier in which a battery can be stored and a support portion is provided;
a carrier storage portion provided in the vehicle body and capable of holding the carrier;
a guide portion capable of supporting, via the support portion, the carrier operated so as to be lifted from the ground in a state in which the carrier is lifted from the ground, and guiding the carrier from an outer side of the vehicle body toward the carrier storage portion, and the guide portion guides the carrier from the carrier storage portion toward the outer side of the vehicle body so as to allow a state in which the carrier is removed from the vehicle body and placed on the ground; and
a positioning portion configured to, when the carrier placed on the ground is operated so as to be lifted and the support portion has reached a position at which the support portion can be supported by the guide portion, stop the operation of lifting the carrier so as to allow transition to a state in which the support portion is supported by the guide portion,
wherein:
the guide portion is a guide rail extending from the carrier storage portion toward an outer side of the vehicle body, and the guide portion comprises an entrance portion provided at an outer end portion of the vehicle body, and the guide rail is formed to be inclined downward from the entrance portion toward the carrier storage portion so as to descend toward the carrier storage portion.

2. The electric work vehicle according to claim 1, wherein:

the support portion is a support roller configured to be supported by the guide rail in the entrance portion, to be separated from the guide rail in the entrance portion, and to be movable along the guide rail, and the positioning portion is configured to, when the carrier placed on the ground is operated so as to be lifted and the support roller has reached the entrance portion, stop the operation of lifting the carrier so as to allow transition to a state in which the support roller is supported by the guide rail from the entrance portion.

3. An electric work vehicle comprising:

a vehicle body capable of traveling;

a carrier in which a battery can be stored and a support portion is provided;

a carrier storage portion provided in the vehicle body and capable of holding the carrier;

a guide portion capable of supporting, via the support portion, the carrier operated so as to be lifted from the ground in a state in which the carrier is lifted from the ground, and guiding the carrier from an outer side of the vehicle body toward the carrier storage portion, and the guide portion guides the carrier from the carrier storage portion toward the outer side of the vehicle body so as to allow a state in which the carrier is removed from the vehicle body and placed on the ground;

a positioning portion configured to, when the carrier placed on the ground is operated so as to be lifted and the support portion has reached a position at which the support portion can be supported by the guide portion, stop the operation of lifting the carrier so as to allow transition to a state in which the support portion is supported by the guide portion; and a resistance portion configured to, when the carrier is operated to move from the carrier storage portion toward an outer side of the vehicle body and has reached a position immediately in front of the entrance portion, provide resistance to the operation of moving the carrier.

4. The electric work vehicle according to claim 3, wherein:

the support portion is a support roller configured to be supported by the guide rail in the entrance portion, to be separated from the guide rail in the entrance portion, and to be movable along the guide rail, and the resistance portion is an opening that allows entry and exit of the support roller.

5. The electric work vehicle according to claim 3, wherein the guide portion is a guide rail extending from the carrier storage portion toward an outer side of the vehicle body, and the guide portion has an entrance portion provided at an outer end portion of the vehicle body.

6. An electric work vehicle comprising:

a vehicle body capable of traveling;

a carrier in which a battery can be stored and a support portion is provided;

a carrier storage portion provided in the vehicle body and capable of holding the carrier:

a guide portion capable of supporting, via the support portion, the carrier operated so as to be lifted from the ground in a state in which the carrier is lifted from the ground, and guiding the carrier from an outer side of the vehicle body toward the carrier storage portion, and the guide portion guides the carrier from the carrier storage portion toward the outer side of the vehicle body so as to allow a state in which the carrier is removed from the vehicle body and placed on the ground;

a positioning portion configured to, when the carrier placed on the ground is operated so as to be lifted and the support portion has reached a position at which the support portion can be supported by the guide portion, stop the operation of lifting the carrier so as to allow transition to a state in which the support portion is supported by the guide portion; and a stopper portion configured to, when the carrier is operated to move from the carrier storage portion toward an outer side of the vehicle body and has reached the entrance portion, stop the operation of moving the carrier.

7. The electric work vehicle according to claim 6, wherein:

the support portion is a support roller configured to be supported by the guide rail in the entrance portion, to be separated from the guide rail in the entrance portion, and to be movable along the guide rail, and the stopper portion is configured to stop the operation of moving the carrier by abutting against the support roller.

8. The electric work vehicle according to claim 6, wherein the guide portion is a guide rail extending from the carrier storage portion toward an outer side of the vehicle body, and the guide portion has an entrance portion provided at an outer end portion of the vehicle body.

* * * * *